United States Patent [19]
Takamatsu et al.

[11] 3,781,185
[45] Dec. 25, 1973

[54] METAL AND CHLOROPRENE RUBBER COMPOSITE MATERIAL

[75] Inventors: Hideaki Takamatsu, Tokyo; Noboru Murashima; Koichi Nishihira, both of Kobe, all of Japan

[73] Assignees: Agency of Industrial Science & Technology, Tokyo; Bando Chemical Industries, Ltd., Hyogo-ku, Kobe, Japan

[22] Filed: June 18, 1970

[21] Appl. No.: 47,381

[30]  Foreign Application Priority Data
June 20, 1969 Japan.............................. 44/48411
June 20, 1969 Japan.............................. 44/48412
June 20, 1969 Japan.............................. 44/48413

[52] U.S. Cl................ 161/217, 161/255, 161/160, 156/306, 156/309, 260/41.5 A
[51] Int. Cl............................................ B32b 15/04
[58] Field of Search............... 260/29.7 R, 29.7 PT, 260/29.7 M, 29.7 S, 41.5 A, 92.3, 37 R, 33.8, 899, 41.5, 41 A, 41.5 A, 41.5 R, 41 R, 29.7 P; 161/207, 208, 216, 217, 218, 255, 256; 117/219, 223, 133, 161 UD, 162; 156/306, 33; 106/288 B, 306

[56] References Cited
UNITED STATES PATENTS

| | | |
|---|---|---|
| 2,809,179 | 10/1957 | Endres et al............... 260/41.5 MP |
| 2,958,578 | 11/1960 | Baker et al................. 106/288 B X |
| 3,122,518 | 2/1964 | Logemann et al.......... 260/41.5 MP |
| 3,287,315 | 11/1966 | Connor et al.............. 260/41.5 A X |
| 3,345,324 | 10/1967 | Bristol et al................ 260/41.5 R |
| 3,505,251 | 4/1970 | Warner........................ 260/41.5 A |
| 2,917,407 | 12/1959 | Cipriano et al........... 117/161 UD X |
| 2,964,490 | 12/1960 | Howland et al. .............. 260/29.7 S |
| 3,328,363 | 6/1967 | Blümel et al.................... 260/92.3 X |

OTHER PUBLICATIONS

Hodgman, C. D., Handbook of Chemistry and Physics, Chem. Rubber Co., Cleveland, Ohio (1950), pages 458–461, 544, 545, 548–551, and 572–575.

Remy, H., et al., Treatise on Inorganic Chemistry, Elsevier (New York) 1956, pages 493–498 relied on, copy in Reference Library.

*Primary Examiner*—George F. Lesmes
*Assistant Examiner*—Lorraine T. Kendell
*Attorney*—Ernest G. Montague

[57] ABSTRACT

A vulcanizing agent and other component chemicals necessary for rubber formulation are added to a co-precipitate containing chloroprene rubber and barium silicate, and the rubber compound so obtained is subjected to blending. Further, the rubber compound is overlaid with a metal sheet and valcanized under application of heat and pressure, whereby a metal and chloroprene rubber composite material is produced.

4 Claims, 5 Drawing Figures

PATENTED DEC 25 1973

3,781,185

METAL AND CHLOROPRENE RUBBER COMPOSITE MATERIAL

BACKGROUND OF THE INVENTION

This invention relates to a composite material of metal and a chloroprene rubber compound.

Chloroprene rubber displays excellent resistance to weather conditions, ozone, industrial chemicals, oils, solvents and fire and, because of these characteristics, is used extensively for industrial materials and building materials.

Metals, such as, for example, stainless steel and aluminum, are also used widely for industrial materials and building materials.

It is, however, not easy to manufacture a composite material of stainless steel and a rubber compound or a composite material of aluminum and a rubber compound. According to a known method, the surface of the stainless steel or aluminum body has been thoroughly cleaned of oil and rough and subsequently joined to a rubber compound with the aid of a bonding agent. When the union is achieved by the use of a bonding agent, however, the adhesive strength varies with the composition of the rubber compound and the production conditions thereof. Therefore, it has been difficult to obtain a composite material of consistent properties even from a rubber compound of the same composition. Furthermore, the layer of the bonding agent must be applied uniformly over the entire surface of the metal body being joined. If any portion thereof escapes being overlaid with the adhesive agent, the finished composite material will be of considerably lower quality. Unlike other metals, brass and other similar metals which contain copper and zinc provide a strong union with rubber compound without an adhesive agent. Thus, there has been known a method in which a composite material of a given metal and a rubber compound is produced by coating the metal surface with brass and subsequently joining the brass layer with the rubber compound. However, this method cannot be used for all metals, because the adhesive force greatly varies with the chemical composition of brass used. To be specific, the highest adhesive force is exhibited where the ratio of copper to zinc is in the range of from 6:4 to 7:3 but, where the ratio is outside this range, composite materials obtained will suffer from conspicuously lowered adhesive force. As concerns a rubber compound to be used for manufacturing a composite material, the adhesive force acquired by the composite material is varied by the difference in kind and quantity of the various ingredients composing the rubber compound, such as sulfur and vulcanization accelerator. Even in the case of a rubber compound having the optional formulation, the adhesive force is affected by the temperature and time conditions used in vulcanization. With regard to the quantity of sulfur, only a rubber compound having a sulfur content within the range of 2-5 parts per 100 parts of rubber can produce a composite material of satisfactory adhesive force. A deviation from this quantitative range results in the formation of a composite material suffering from inferior adhesive force. As regards a vulcanization accelerator, it is possible to use only a vulcanization accelerator of the kind which involves a slow rising time and a low vulcanization velocity. When the vulcanization time is shortened, there is obtained a composite material with inferior adhesive force. By this reason, the production process cannot be shortened in terms of time. In a rubber compound in which all component chemicals have already been blended, the adhesive force decreases in proportion to the length of time that intervenes between the completion of blending and the time of actual use. Thus, such rubber compound cannot be preserved for a long time. At the time the rubber compound is joined with brass, the adhesive force is caused to vary by various work conditions, including not only vulcanization temperature and vulcanization time but also the workshop's ambient temperature and the prevailing atmospheric temperature, making it extremely difficult to produce composite materials of a consistent degree of adhesive force at all times. Frequently, there are obtained only composite materials of inferior adhesive force. Since brass, unlike other metals, can be joined with a rubber compound without the use of bonding agent as mentioned above, there has widely been adopted a method in which a composite material of a given metal with a rubber compound is obtained by overlaying the metal surface with a brass coating and consequently accomplishing the desired adhesion through the medium of this coating. This method, however, has so many restricting factors that it is quite difficult to obtain a composite material of the desired properties.

An object of the present invention is to provide a composite material of a metal and chloroprene rubber compound having uniform strength.

Another object of this invention is to provide a composite material of a metal and chloroprene rubber compound excelling in resistance to weather conditions, ozone and heat.

Other objects and characteristics of this invention will be explained in detail hereunder by referring to the accompanying drawing.

DETAILED DESCRIPTION OF THE INVENTION

Figure 1:
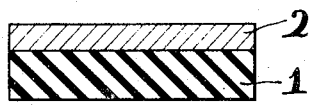
FIG. 1 is a sectional view illustrating a composite material of a metal and a chloroprene rubber compound according to the present invention.

By the present invention, the chloroprene rubber compound (hereinafter referred to as "compound") is produced by blending a chloroprene rubber-barium silicate coprecipitate incorporating therein at least about 80 parts of barium silicate per 100 parts of the rubber component in chloroprene rubber with a vulcanizing agent and other component chemicals necessary for rubber formulation added thereto. The rubber compound obtained is overlaid with a metal and valcanized under application of heat and pressure, whereby a metal and rubber composite material is produced.

The chloroprene rubber-barium silicate coprecipitate is produced by the following method. A mixture of a chloroprene rubber latex and the aqueous solution of an alkali metal salt or silicic acid is combined with the aqueous solution of barium salt so as to induce occurrence of a white barium silicate-chloroprene rubber coprecipitate, which is washed with water and dried. The resultant coprecipitate is used as a rubber base or filler in producing the rubber compound.

First, an explanation is made of the case of using the coprecipitate in the form of a rubber base. While the chloroprene rubber-barium silicate is being kneaded in a mixing roll or Banbury mixer, component chemicals necessary for rubber formulation are added thereto. The component chemicals used here are generally accepted chemicals for rubber formulation, including vulcanizing agent, vulcanization accelerator, filler, reinforcing agent and tackifier and they are not limited specifically because of the chloroprene rubber-barium silicate coprecipitate. The rubber compound which has incorporated the chloroprene rubber-barium silicate coprecipitate in an intimately blended form is molded into the shape of a sheet or any other desired shape by means of a roll like a calender roll or an extruder, then cut, punched or, if required, superposed in the form of a lamination, and finally laid over a given metal sheet so as to be vulcanized under application of pressure and heat. Thus is obtained the desired composite material.

In the process of producing the chloroprene rubber-barium silicate coprecipitate according to this invention, it is permissible to have the vulcanizing agent and other component chemicals necessary for rubber formulation incorporated in a suspended state in advance in the chloroprene latex and subsequently cause them to be precipitated together with the aqueous solution of a barium salt.

The composite material of the invention thereof can likewise be obtained in an effective form by using the chloroprene rubber-barium silicate coprecipitate in the form of a filler. Desired performances can be obtained sufficiently by blending this coprecipitate as a filler with a rubber base of a same or different kind. As to the method of blending, this filler may be blended with a rubber compound which has already incorporated the component chemicals for rubber formulation or it may be blended with a rubber base prior to incorporation of the component chemicals. There is no need for paying any special consideration to the means and method of blending. Subsequently, the resultant chloroprene rubber compound incorporating the rubber-barium silicate coprecipitate is fabricated with a roll like a calender roll into a sheet or with an extruder into an extruded article of desired shape, then cut or punched with a punching machine and finally laid over a given metal sheet to be vulcanized under application of pressure and heat, giving birth to the desired composite material.

The composite material of the present invention can be formed by using the rubber compound incorporating the chloroprene rubber-barium silicate coprecipitate as a sole overlay. It can be formed by using the same rubber compound as an intermediary layer as well, namely, by overlaying it with another rubber compound. The lamination may be made by using one or more different kinds of rubber. The range of application can be enlarged to a great extent by using varying kinds of materials in the lamination. By incorporating a foam layer in the lamination, the composite materials obtained can be used widely as anti-vibration, -heat and -sound materials.

Referring to FIG. 1, a rubber compound 1 which is obtained by blending the chloroprene rubber-barium silicate coprecipitate with component chamicals necessary for rubber formulation is laid over a metal sheet 2 and then vulcanized under application of heat and pressure to afford a composite material. The rubber compound 1 may be prepared by incorporating the chloroprene rubber-barium silicate coprecipitate as a filler. Further, the rubber compound may contain a woven fabric or it may be so prepared as to assume a foamed texture upon vulcanization.

Figure 2:
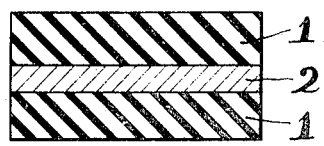
FIG. 2 through FIG. 5 are sectional views of various embodiments of the composite material of FIG. 1.
Figure 3:
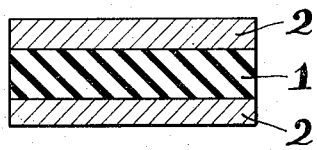
Figure 4:
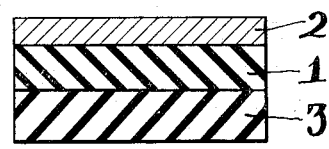
Figure 5:
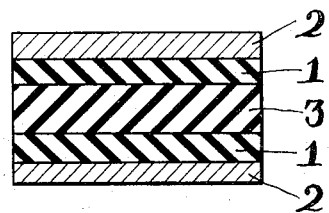

FIG. 2 represents a composite material having a metal sheet 2 inserted as an intermediary layer, with a compound 1 laid over each surface thereof. FIG. 3 shows a composite material having a compound 1 inserted as an intermediary layer, with a metal sheet 1 laid over each surface thereof. Even when each metal sheet 2 has a small thickness and can be easily bent, the composite material thus formed according to the present invention is highly difficult to bend. FIG. 4 illustrates a composite material in which the metal 2 is overlaid by compound 1 and additionally by one or more kinds of rubber compounds 3 other than compound 1 which may include compounds containing foaming agent and woven fabric. In this combination, the rubber compound layer may be reduced below 0.1mm in thickness and therefore can lower the production cost of the composite material. FIG. 5 represents a composite material which is a union of the composite material of FIG. 3 and that of FIG. 4. Numerous kinds of laminated composite material with varying thickness and physical properties can be obtained by uniting the structures of FIG. 1 through FIG. 5 variously.

In the composite material using the rubber-barium silicate coprecipitate of this invention, use of the rubber coprecipitate derived from chloroprene rubber provides a strong union even with the surface of a copper sheet or other copper metal article of the kind which repels rubber overlaps in the absence of an adhesive agent. Moveover, the strong union between such copper and the rubber compound can be achieved without incorporating any sulfur at all into the chloroprene rubber-barium silicate coprecipitate. Therefore, it becomes possible to join a rubber compound of a different kind with a copper sheet by using the chloroprene rubber coprecipitate as an intermediary layer.

As described above, the present invention provides strong union between a metal sheet and a rubber compound prepared by incorporating a vulcanizing agent and other components necessary for rubber formulation into the chloroprene rubber-barium silicate coprecipitate by overlaying the metal sheet with the rubber compound in its unmodified state and then vulcanizing the rubber compound under application of pressure and heat. Thus, the composite material produced thereby is excellent in that the work of joining can be achieved easily, efficiently and inexpensively without necessitating either pre-treatments which are indispensable for the conventional methods or the so-called waiting time for volatizing the solvent after application.

The composite material of the present invention is excellent also in resistance to weather conditions. Outdoor tests conducted by using a Weather-Ometer show that, while the adhesive force between an aluminum article and a rubber compound declines in the composite material produced by the conventional joining method, the adhesive force increases in the composite material with the rubber compound incorporating therein the chloroprene rubber-barium silicate coprecipitate. Because of this, the composite material of this invention is particularly effective when used for building materials which are required to offer resistance to weather conditions, ozone and fire and for industrial materials which are exposed to outdoor conditions.

DESCRIPTION OF THE PREFERRED EMBODIMENTS

The following Examples are further illustrative of this invention and it will be understood that the invention is not limited thereto.

EXAMPLE 1

Polychloroprene rubber compounds were prepared in two different formulations by way of comparing adhesive force.

| Formulation | 1) | (2) |
|---|---|---|
| Polychloroprene G-type latex coprecipitate | 260 | — |
| Polychloroprene W-type latex coprecipitate | — | 260 |
| Neoprene GRT | 43 | — |
| Magnesia | 5.7 | 4 |
| Zinc white | 7.2 | 5 |
| Stearic acid | 0.7 | — |
| Accelerator-22 | — | 0.35 |
| Age resistor-PA | — | 1 |

The composites of the aforementioned formulations (1) and (2) were each laid over a stainless steel sheet (SUS-27) and valcanized at 150°C for 20 minutes. After the valcanization, they showed the following shear adhesive force.

| Formulation | (1) | (2) |
|---|---|---|
| Shear adhensive force | 52 kg/cm² | 50 kg/cm² |

Thus, the composites which used the chloroprene latex-barium silicate coprecipitate exhibited satisfactory adhesive force, irrespectively of the difference between W-type and G-type.

EXAMPLE 2

A compound of the following formulation was blended and molded into a sheet.

| | |
|---|---|
| Barium silicate-rubber coprecipitate (SBR latex 2105, barium silicate 160 parts) | 260 (parts) by weight) |
| Zinc white | 5 |
| Stearic acid | 1.5 |
| Sulfur | 3 |
| Accelerator DM | 1.5 |
| Accelerator TT | 0.1 |

The sheet was laid each over two brass sheets (the ratio of copper to zinc 70:30 in one sheet and 60:40 in the other) and valcanized at 150°C for 15 minutes under pressure. The adhesive force between the metal and the rubber was found as follows.

| | Shear adhesive force |
|---|---|
| Brass having coper-zinc ratio of 70:30 | 51.2 kg/cm² |
| Brass having copper-zinc ratio of 60:40 | 52.3 kg/cm² |

EXAMPLE 3

Rubber compound was prepared by the formulation of the Example 2, except that the content of sulfur was changed. The composite materials using these compounds were found to have the following adhesive force between the metal and the rubber. The brass sheet used in this case had a copper-zinc ratio of 60:40.

| Sulfur PHR | 0.5 | 1.0 | 2.0 | 3.0 |
|---|---|---|---|---|
| Adhesive force kg/cm² | 58 | 58 | 55 | 52 |

EXAMPLE 4

Rubber compounds incorporating the barium silicate-chloroprene rubber coprecipitate in the formulations indicated below were found to have the following adhesive forces. (Parts by weight)

| Formulation | 1 | 2 | 3 | 4 | 5 | 6 |
|---|---|---|---|---|---|---|
| Chloroprene latex [1] | 0 | 180 | 200 | 220 | 240 | 280 |
| Neoprene GRT | 100 | | 7.2 | 25 | 60.8 | |
| Magnesium oxide | 4 | 4 | 4 | 4.3 | 5 | 5.6 |
| Zinc white | 5 | 5 | 5 | 5.4 | 6.3 | 8.1 |
| Stearic acid | 0.5 | 0.5 | 0.5 | 0.6 | 0.6 | 0.8 |
| Adhesive force, kg./cm.³ | | 22.5 | 39.4 | 50.3 | 70.5 | 78.5 |

[1] Showa Neoprene 842A—barium silicate coprecipitate.

The brass used in this case had a copper-zinc ratio of 60:40.

The vulcanization was carried out at 150°C for 15 minutes.

EXAMPLE 5

The rubber compound of Formulation No. 5 of Example 4 was joined with different metal sheets and tested for adhesive force.

| Metal article used | Adhesive force |
|---|---|
| Brass sheet having copper-zinc ratio of 70:30 | 73 kg/cm² |
| Brass sheet having copper-zinc ratio of 60:40 | 71 |
| Copper sheet | 51 |
| Zinc-coated steel sheet | 29 |

The vulcanization was carried out at 150°C for 15 minutes.

Example 6

Rubber compounds were prepared in the following formulations, using the coprecipitates indicated respectively:

| Formulation A | CR coprecipitate G-type | 260 parts |
|---|---|---|
| | Neoprene GRT | 43 |
| | Magnesia | 5.7 |
| | Zinc white | 7.2 |
| | Stearic acid | 0.7 |
| Formulation B | CR coprecipitate W-type | 260 |
| | Magnesia | 4 |
| | Zinc white | 5 |
| | Accelerator-22 | 0.35 |
| | Age resistor-PA | 1 |
| (Remarks) | Chloroprene G-type = Showa Neoprene 842-A | |
| | Chloroprene W-type = Showa Neoprene 736 | |

The rubber compounds of the preceding formulations "A" and "B" were each mixed and molded into a sheet, laid over an aluminum sheet AO (pure aluminum) and another aluminum sheet 52S (aluminum-magnesium alloy) and then vulcanized at 150°C for 20 minutes under application of pressure. The adhesive force between the aluminum sheets and the rubber compounds was found to be as follows.

| | Type of aluminum | |
|---|---|---|
| Formulation | A0 | 52S |
| A | 55 kg/cm² | 53 |
| B | 50 | 51 |

EXAMPLE 7

Chloroprene rubber-barium silicate coprecipitates were obtained by adding varying amounts of barium silicate to a fixed amount of chloroprene rubber compounds using these coprecipitates were found to exhibit the following adhesive forces when jointed with aluminum. As a result, addition of more than 80 parts was found to be effective. The compounds incorporating 120 or more parts of barium silicate were blended with different amounts of Neoprene GRT prior to use. The final compounds were so prepared as to contain an equal amount of barium silicate in the rubber.

| Formulation | 1 | 2 | 3 | 4 | 5 | 6 | 7 |
|---|---|---|---|---|---|---|---|
| Barium silicate in coprecipitate (parts) | 60 | 80 | 100 | 120 | 140 | 160 | 180 |
| Coprecipitate | 160 | 180 | 200 | 220 | 240 | 260 | 280 |
| Neoprene GRT | — | — | — | 7.2 | 2.5 | 4.3 | 60.8 |
| Magnesia | 4 | 4 | 4 | 4.3 | 5 | 5.7 | 6.5 |
| Zinc white | 5 | 5 | 5 | 5.4 | 6.3 | 7.2 | 8.1 |
| Stearic acid | 0.5 | 0.5 | 0.5 | 0.5 | 0.6 | 0.7 | 0.8 |

Vulcanizing conditions - 150°C × 20 minutes
Adhesive force (shear adhesive force) (Kg/cm²)

|  | A0 | 52S |
|---|---|---|
| No. 1 | — | — |
| 2 | 18 | 15 |
| 3 | 25 | 21 |
| 4 | 36 | 30 |
| 5 | 47 | 48 |
| 6 | 55 | 53 |
| 7 | 58 | 57 |

Referential Example

The following rubber compounds incorporating coprecipitates of other synthetic rubbers were prepared with a view to comparison with the present invention.

"a" {
  SBR coprecipitate 250
  Zinc white 5
  Stearic acid 1.5
  Sulfur 3
  Dm (accelerator) 1.5
  T.T. (accelerator) 0.1
}

"b" {
  BR coprecipitate 260
  Zinc white 5
  Stearic acid 1.5
  Sulfur 3
  DM (accelerator) 1.5
  T.T. (accelerator) 0.5
}

"c" {
  NBR coprecipitate 260
  Zinc white 5
  Sulfur 1.5
  Stearic acid 1
  DM (accelerator) 1
}

"d" {
  Vinyl pyridine-SBR coprecipitate 260
  Zinc white 5
  Stearic acid 1.5
  Sulfur 3
  DM (accelerator) 1.5
  T.T. (accelerator) 0.5
}

Vulcanization conditions - 150°C × 20 minutes
Shear adhesive force (Kg/cm²)

| Type of aluminum Formulation | A0 | 52S |
|---|---|---|
| a | 47 | 45 |
| b | x Incapable of being molding by roll | |
| c | Very low adhesive force | |
| d | 26 | 18 |

EXAMPLE 8

The compound of Formulation "A" of Example 6 according to this invention and the compound of Formulation "a" of Referential Example under Example 7 were compared with respect to the relationship between vulcanization time and adhesive force. The results are as follows.

Vulcanization conditions 150°C
Type of aluminum used Aluminum A0
Adhesive force (Kg/cm²)

| Vulcanization time (min.) | a | A |
|---|---|---|
| 10 | 45 | 52 |
| 20 | 47 | 55 |
| 20 | 46.5 | 59 |
| 40 | 44 | 58 |
| 60 | 43 | 62 |

The data shown above shows that the composite using barium silicate-chloroprene rubber coprecipitate had high adhesive force from the beginning and the force increased with the increasing length of vulcanization time. Thus, this compound is expected to provide high adhesive force.

Example 9

The compounds of Formulation "A" of Example 6 and that of Formulation "a" of Referential Example under Example 7 were subjected to outdoor tests by using a Weather-Ometer. The adhesive force was found to change as follows. Outdoor tests:

Adhesive Force (Kg/cm²)

| Type of aluminum | A0 | | 52S | |
|---|---|---|---|---|
| Formulation | a | A | a | A |
| Time of exposure (hours) | | | | |
| 200 | 42 | 55 | 40 | 51 |
| 400 | 37 | 57 | 35 | 47 |
| 600 | 37 | 62 | 35 | 48 |

Test conditions — Carbon arc Weather-Ometer
50°C × 60% RH
Spray cycle 18/120 min.

The test proved that the rubber compound incorporating barium silicate-chloroprene rubber coprecipitate undergoes no aging.

EXAMPLE 10

The composite materials using the rubber compound of Formulation "a" of Example 7 and that of Formulation "A" of Example 6 were subjected to aging test by using a gear type aging oven. The results were as shown below.

Results of aging test:

Adhesive Force (Kg/cm²)

| Type of aluminum | A0 | | 52S | |
|---|---|---|---|---|
| Formulation | a | A | a | A |
| Exposure conditions | | | | |
| 70°C × 2 days | 42 | 57 | 40 | 51 |
| 4 days | 36 | 51 | 33 | 59 |
| 7 days | 35 | 53 | 30 | 63 |
| 120°C × 2 days | 39 | 55 | 40 | 68 |
| 4 days | 34 | 60 | 35 | 80 |
| 7 days | 38 | 67 | 28 | 161 |

The data shown above suggests that the composite material of Formulation "a" underwent aging because of heat, while the composite material of Formulation body of Formulation "A" had its adhesive force increased to a great extent by virtue of heat.

We claim:

1. A composite material comprising a metal portion and a rubber portion bonded integrally with said metal portion, said rubber portion comprising a vulcanized admixture of component chemicals for rubber formulation and a chloroprene rubber-barium silicate coprecipitate, said chloroprene rubber-barium coprecipitate containing at least 80 parts of barium silicate per 100 parts of chloroprene rubber in said coprecipitate.

2. A composite material comprising a metal portion and a rubber portion bonded integrally with said metal portion, said rubber portion comprising a vulcanized rubber composition containing a chloroprene rubber-barium silicate coprecipitate, said chloroprene rubber-barium coprecipitate containing at least 80 parts of barium silicate per 100 parts of chloroprene rubber in said coprecipitate.

3. A process for making a composite material having a rubber portion bonded integrally with a metal portion comprising overlaying a rubber mixture selected from (a) an admixture of component chemicals for formulation, and a chloroprene-barium silicate coprecipitate, and (b) a rubber composition containing a chloroprene rubber-barium silicate coprecipitate, on said metal portion, said chloroprene rubber-barium coprecipitate containing at least 80 parts of barium silicate per 100 parts of chloroprene rubber in said coprecipitate, and vulcanizing and bonding said rubber mixture to said metal portion under pressure and heat.

4. The process of claim 3 wherein said chloroprene rubber-barium silicate is manufactured by adding an aqueous solution of a barium salt to a mixture of chloroprene rubber and an aqueous solution of an alkali metal salt of silicic acid, thereby a chloroprene rubber-barium silicate coprecipitate is obtained, and washing with water and then drying said coprecipitate.

* * * * *